US008475654B1

(12) United States Patent
Smith (10) Patent No.: US 8,475,654 B1
(45) Date of Patent: Jul. 2, 2013

(54) DOWNSPOUT DRAIN CONNECTION AND FILTER

(75) Inventor: Jeffrey E. Smith, Alpharetta, GA (US)

(73) Assignee: Jeffrey E. Smith, Alpharetta, GA (US)

( * ) Notice: Subject to any disclaimer, the term of this patent is extended or adjusted under 35 U.S.C. 154(b) by 303 days.

(21) Appl. No.: 12/773,672

(22) Filed: May 4, 2010

Related U.S. Application Data (60) Provisional application No. 61/215,255, filed on May 4, 2009, provisional application No. 61/285,477, filed on Dec. 10, 2009.

(51) Int. Cl.
*E04D 13/076* (2006.01)
*E04D 13/08* (2006.01)
*B01D 35/02* (2006.01)

(52) U.S. Cl.
CPC ............ *E04D 13/0767* (2013.01); *E04D 13/08* (2013.01); *B01D 35/02* (2013.01)
USPC ................... 210/162; 210/170.03; 210/433.1; 210/447; 210/459; 210/474; 52/12; 52/16

(58) Field of Classification Search
USPC ................. 210/162, 170.03, 433.1, 446, 447, 210/459, 460, 474; 52/11, 12, 16
See application file for complete search history.

(56) References Cited

U.S. PATENT DOCUMENTS

| | | |
|---|---|---|
| 455,910 A | 7/1891 | Gordon |
| 577,362 A | 2/1897 | Ettlinger |
| 749,232 A | 1/1904 | Shaw |
| 1,033,195 A | 7/1912 | Robinson |
| 1,239,373 A | 9/1917 | Farmer et al. |
| 1,273,200 A | 7/1918 | Symonds |
| 2,116,863 A | 5/1938 | Dinley |
| 2,397,655 A | 4/1946 | Francis |
| 2,586,145 A | 2/1952 | Breuer et al. |
| 2,655,408 A | 10/1953 | Williams |
| 2,661,225 A | 12/1953 | Lyon |
| 2,814,529 A | 11/1957 | Arnt |
| 3,861,419 A | 1/1975 | Johnson |
| 3,966,121 A | 6/1976 | Littman |
| 4,112,568 A | 9/1978 | Hale |
| 4,182,376 A * | 1/1980 | Nilsson ............................. 52/16 |
| 4,247,136 A | 1/1981 | Fouss et al. |
| 4,273,367 A | 6/1981 | Keeney et al. |
| 4,480,855 A | 11/1984 | Rosenbaum |
| 4,575,133 A | 3/1986 | Nattel |
| 4,615,153 A | 10/1986 | Carey |
| 4,688,720 A | 8/1987 | MacDonald |
| 4,798,028 A * | 1/1989 | Pinion ............................. 52/16 |

(Continued)

*Primary Examiner* — Christopher Upton
(74) *Attorney, Agent, or Firm* — Myers Bigel Sibley & Sajovec, PA (57) ABSTRACT

Included in this disclosure is a downspout drain filter for rain gutter downspouts. The downspout drain filer comprises elongated housing having an axis, a top portion, and a bottom portion. A transition portion connects the top portion to the bottom portion. The top portion includes an intake opening, a top portion perimeter, a debris opening, a filter attachment location, and a downspout attachment location. The downspout attachment location includes a flexible collar that defines a downspout attachment location perimeter that is less than the top portion perimeter. The bottom portion includes a flexible collapsible body that extends from the transition portion. A connection end is positioned opposite the transition portion as a part of the bottom portion. A filter is positioned in the top portion to direct debris out the debris opening and to permit liquid to pass to the bottom portion.

17 Claims, 9 Drawing Sheets

U.S. PATENT DOCUMENTS

| | | |
|---|---|---|
| 4,801,377 A | 1/1989 | Bolt |
| 4,904,113 A | 2/1990 | Goddard et al. |
| 5,031,426 A | 7/1991 | Wilson |
| 5,150,930 A | 9/1992 | Petty et al. |
| 5,332,270 A | 7/1994 | Petty et al. |
| 5,358,006 A | 10/1994 | Sweers |
| 5,358,007 A | 10/1994 | Carlberg |
| 5,375,891 A | 12/1994 | Sicotte |
| 5,387,016 A | 2/1995 | Joseph et al. |
| 5,511,829 A | 4/1996 | Sicotte et al. |
| 5,658,092 A | 8/1997 | Sweers |
| 5,709,051 A | 1/1998 | Mazziotti |
| 5,823,580 A | 10/1998 | Ungerecht |
| 5,862,632 A | 1/1999 | Zima |
| 5,915,735 A | 6/1999 | Noble |
| 5,985,158 A * | 11/1999 | Tiderington ............ 210/447 |
| 6,007,110 A | 12/1999 | Amatsutsu |
| 6,024,127 A * | 2/2000 | Johnson .................. 52/16 |
| 6,041,825 A | 3/2000 | Smith et al. |
| 6,202,358 B1 | 3/2001 | Janesky |
| 6,223,777 B1 | 5/2001 | Smith et al. |
| 6,263,618 B1 * | 7/2001 | Jones ....................... 210/459 |
| 6,612,075 B1 | 9/2003 | Knoop et al. |
| 7,017,614 B2 | 3/2006 | Handley |
| 7,017,949 B2 | 3/2006 | Luft et al. |
| 7,677,271 B2 | 3/2010 | Boettner et al. |
| 2003/0051414 A1 * | 3/2003 | Bessette .................. 52/16 |
| 2005/0109693 A1 * | 5/2005 | Allard ..................... 210/162 |
| 2008/0023959 A1 | 1/2008 | Crawford |
| 2008/0086953 A1 * | 4/2008 | Graf ........................ 52/12 |

* cited by examiner

DOWNSPOUT DRAIN CONNECTION AND FILTER

CROSS-REFERENCES TO RELATED APPLICATIONS

This application claims benefit of the following Provisional Patent Applications which are hereby incorporated by reference: U.S. Provisional Application No. 61/215,255 filed May 4, 2009 entitled "A Landscape Drain Filter," and U.S. Provisional Application No. 61/285,477 filed Dec. 10, 2009 entitled "Low Profile Downspout Extension And Landscape Drainage Assembly."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

All patents and publications described or discussed herein are hereby incorporated by reference in their entirety.

BACKGROUND OF THE INVENTION

The present disclosure relates generally to a filtering device, and more particularly to a device used to filter or remove debris from a rain water carrying system. The device of the current disclosure is particularly suited for rain gutter downspouts used on structures such as homes, buildings, and the like, to divert rain water away from that structure as the rain hits a portion of that structure, such as the roof, and is directed down and through gutters and other water carrying elements.

For years, buildings have been equipped with gutters and downspouts for moving rainwater from roofs and away from foundations. Typically, the gutters of a building are connected to a number of downspouts to remove the rainwater from the gutter. A fixed angle elbow connector is typically utilized at the lower end, or exit end, of the downspout to exhaust the rainwater along the ground and in a direction away from the side of the building.

A known problem with gutter systems is debris, such as flora, including foliage, berries, needles, nuts, flowers, and the like, and fauna, including nests, remains and the like, can enter into a gutter system causing clogging and preventing the proper flow of water to the downspouts and through the gutter system.

The prior art includes solid gutter covers design to prevent the debris from entering the gutter system. The solid gutter covers are designed to channel water and debris over the top surface of the gutter cover. The gutter covers use the capillary effect to direct the water into a rain channel which then directs the water into the gutter. The gutter covers restrict entry of the debris into the rain channel and facilitate movement of the debris over and off the gutter cover surface.

The gutter covers have drawbacks when a downspout from the upper roof of a building directs water to the lower roof or during heavy rain periods. The amount of water flow from the upper roof downspout or the heavy rain exceeds the capacity of the solid gutter cover, causing water to flow over the solid gutter cover and by pass the rain channel. This can cause damage to and around the structure including erosion and foundation issues.

Other prior art devices have been designed with a filter to trap the debris but require manually removing of the filter for cleaning. If the filter is left unmaintained, the obstruction can create a serious rain water runoff and erosion problem. Other devices are self cleaning but lack features for easy installation. For example, the installation of some prior art devices to a rain gutter system, especially those connected to an underground drainage system, requires extensive digging to reach buried pipe in order to make the proper connection for the transport of the rain water away from the structure. Other prior art devices require connecting additional pipe to these prior art devices in order for the system to connect to an underground drainage system.

Additionally, other prior art devices include the connectors that attach to downspouts that direct the water to buried drain pipes of an underground drainage system. However, these prior art devices lack the capability to filter the debris from the system and thus cause clogged drains and possible damage to the structure to which they are attached as the debris builds in the system.

Thus there is a need in the art for a downspout drain connection and filter. Preferably this device includes a self-cleaning filter that removes debris from the liquid flow path of the downspout. Preferably this filtering is positioned such that the debris is removed before it enters any other downstream liquid carrying elements, such as an underground drainage system. Preferably this device is easily attached to existing downspouts and downstream liquid carrying elements and has a degree of flexibility to allow for adjustments in attachments on both the downstream liquid carrying element in and on the downspout connection end.

BRIEF SUMMARY OF THE INVENTION

Included in this disclosure is a downspout drain filter for rain gutter downspouts. The downspout drain filer comprises elongated housing having an axis, a top portion, and a bottom portion. A transition portion connects the top portion to the bottom portion. The top portion includes an intake opening, a top portion perimeter, a debris opening, a filter attachment location, and a downspout attachment location. The downspout attachment location includes a flexible collar that defines a downspout attachment location perimeter that is less than the top portion perimeter. The bottom portion includes a flexible collapsible structure that extends from the transition portion. A connection end is positioned opposite the transition portion as a part of the bottom portion.

A filter is positioned in the top portion to direct debris out the debris opening and to permit liquid to pass to the bottom portion. The filter attachment location can include at least one filter channel positioned to hold the filter in the top portion at an angle skewed to the axis. This filter channel can be spaced around the perimeter of the top portion along its length.

The connection end of the bottom portion can include a plurality of protrusions extending radially outward from the axis. This connection can also further include a connection in channel shaped into the wall of a connection end. Additionally, the flexible collapsible structure of the bottom portion can include a plurality of foldable sections that are moveable between a first retracted position and a second extended position.

The downspout attachment location of the top portion can include at least one collar channel position to removeably attach the collar within a top portion perimeter. This collar can further include a collar flange shaped to removeably engage the collar channel to removeably attach the collar within the top portion perimeter. Additionally, the collar can include a body extending from the collar flanged towards the axis in a direction skewed to the axis. This body can be positioned to removeably secure the downspout drain filter to the rain gutter downspout. Additionally, a plurality of armatures can be included extending from the body towards the axis. These armatures can be positioned to removeably secure the downspout drain filter to the rain gutter downspout.

It is therefore a general object of the present invention to provide a downspout drain filter for rain gutter downspouts.

Another object of the present invention is to increase the efficiency of rain gutter downspouts by providing a filter for debris within the liquid flow path of those downspouts.

Still another object of the present invention is to provide a substantially self-cleaning filter for a rain gutter downspout.

Yet still another object of the present invention is to provide a downspout drain filter that is capable of attaching to various downspouts and liquid carrying elements to facilitate the removal of rain away from a structure.

Other and further objects, features and advantages of the present invention will be readily apparent to those skilled in the art upon reading of the following disclosure when taken in conjunction with the accompanying drawings.

BRIEF DESCRIPTION OF THE SEVERAL VIEWS OF THE DRAWINGS

FIG. 1 shows this downspout drain filter in use in one example of an environment in which it is attached to a downspout and a further liquid carrying element.

FIG. 3 shows an example of a collar expanded from the downspout drain filter.

FIG. 8 shows an alternate filter used in a downspout drain filter made in accordance with the current disclosure.

FIG. 9 shows an alternate filter used in a downspout drain filter made in accordance with the current disclosure.

FIG. 15 shows an example of a collar removed from the top portion of the downspout drain filter.

DETAILED DESCRIPTION OF THE INVENTION

Referring generally now to FIGS. 1-17B, a downspout drain filter is shown and generally designated by the numeral 10. The drain filter 10 is used in conjunction with a rain gutter downspout 12 to remove debris 14 from the fluid flow path 16. The fluid flow path 16 preferably moves rain that collects on the structure 18, including the roof of the structure 18. The drain filter 10 can be used with a fluid flow element 20 such as an underground rainwater dispersing system.

Figure 1:
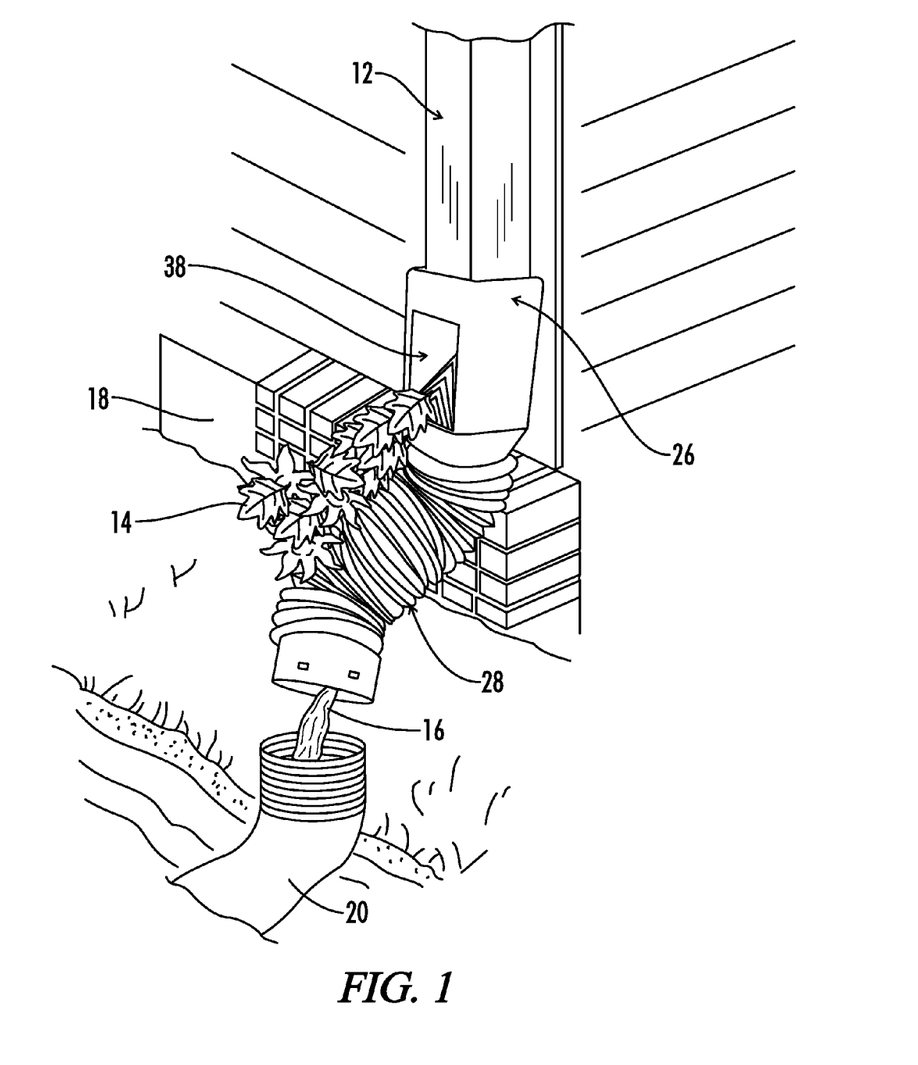
FIG. 1 is a perspective view of an embodiment of a downspout drain filter made in accordance with the current disclosure.
Figures 2, 3:
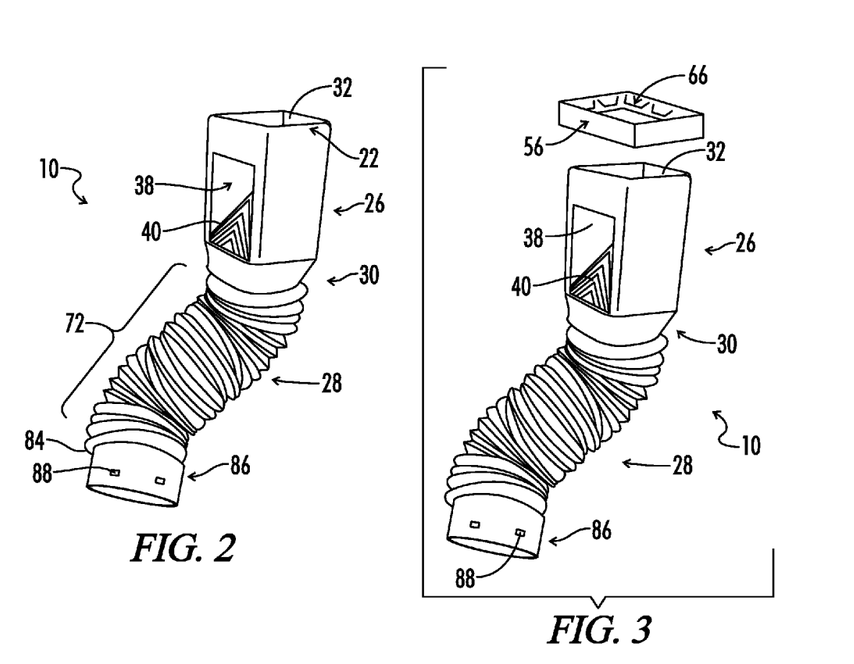
FIG. 2 is a perspective view of an embodiment of a downspout drain filter made in accordance with the current disclosure.
FIG. 3 is a view similar to FIG. 2.
Figure 4:
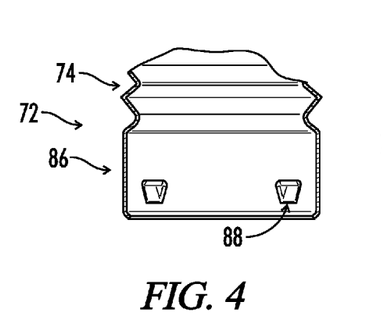
FIG. 4 shows a detailed view of a connection end of a downspout drain filter made in accordance with the current disclosure.
Figure 5:
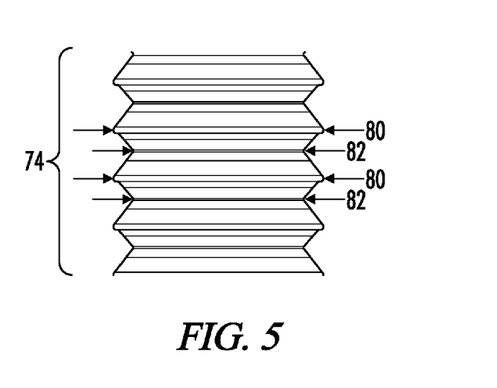
FIG. 5 shows an example of a flexible collapsible body made in accordance with the current disclosure.
Figure 6:
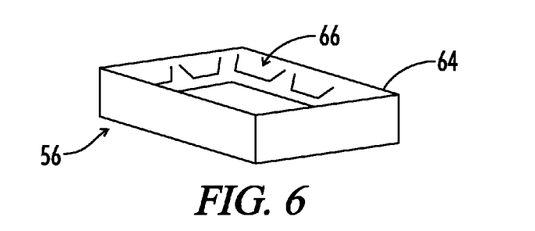
FIG. 6 shows a view of a collar made in accordance with the current disclosure.
Figures 11, 12, 13:
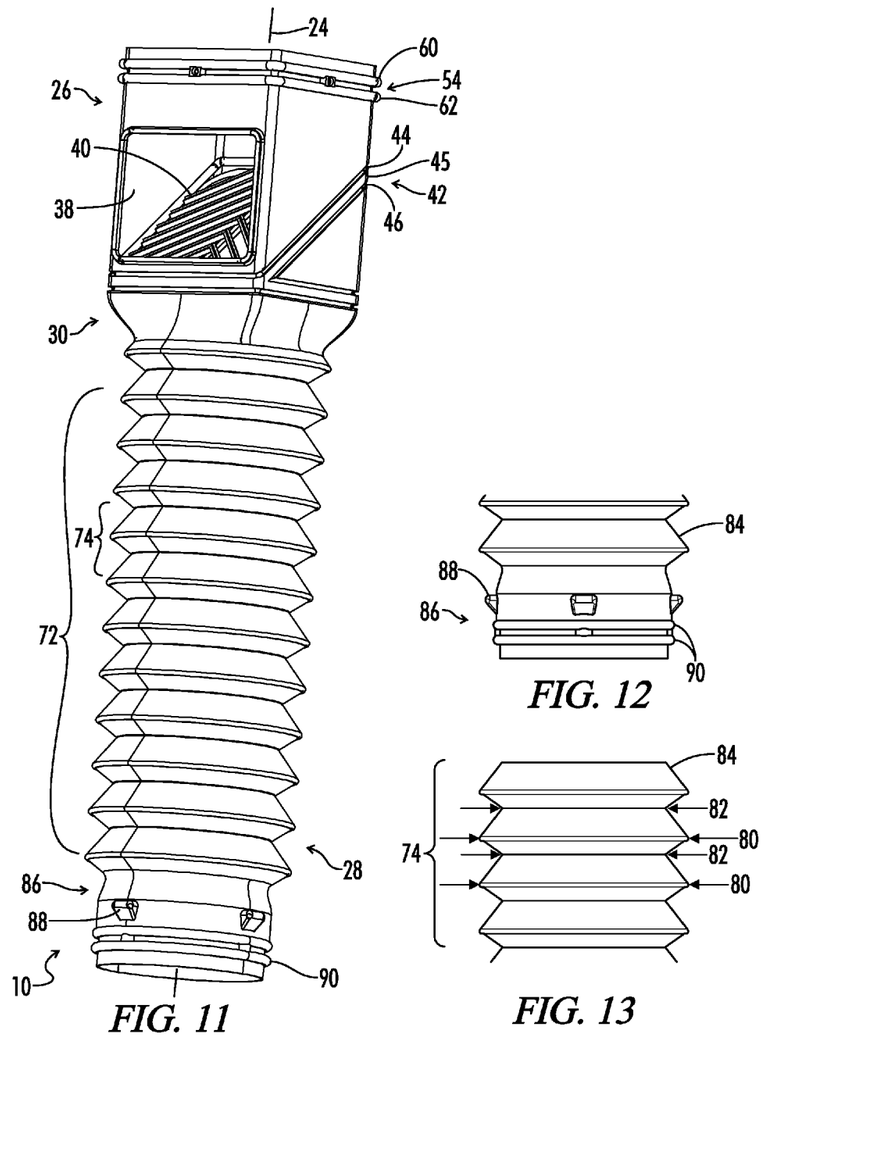
FIG. 11 shows a perspective view of a downspout drain filter made in accordance with the current disclosure.
FIG. 12 is a detailed view of a connection end made in accordance with the current disclosure.
FIG. 13 is a detailed view of a portion of a flexible collapsible body made in accordance with the current disclosure.
Figure 14:
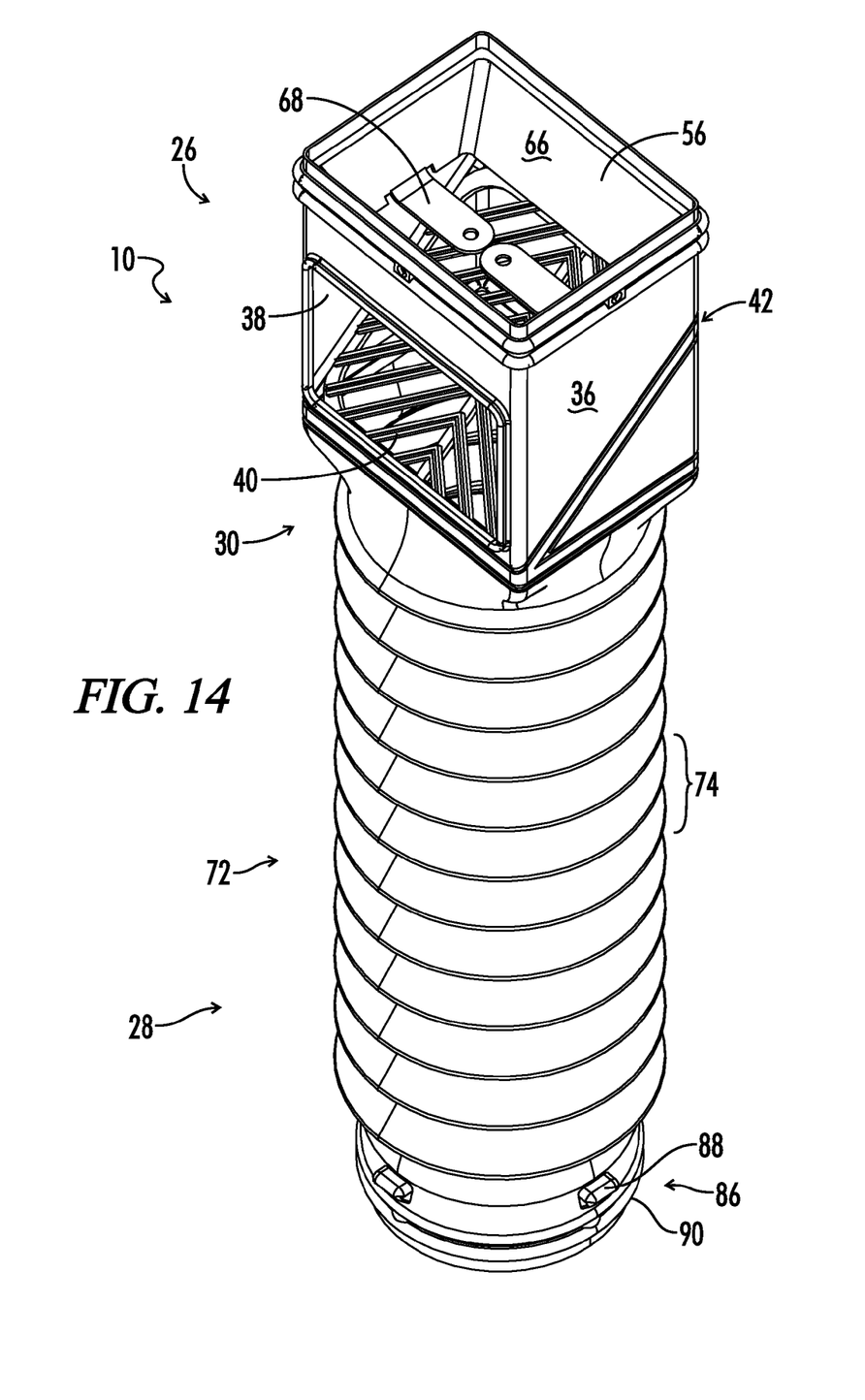
FIG. 14 is a top perspective view of a downspout drain filter made in accordance with the current disclosure.
Figure 15:
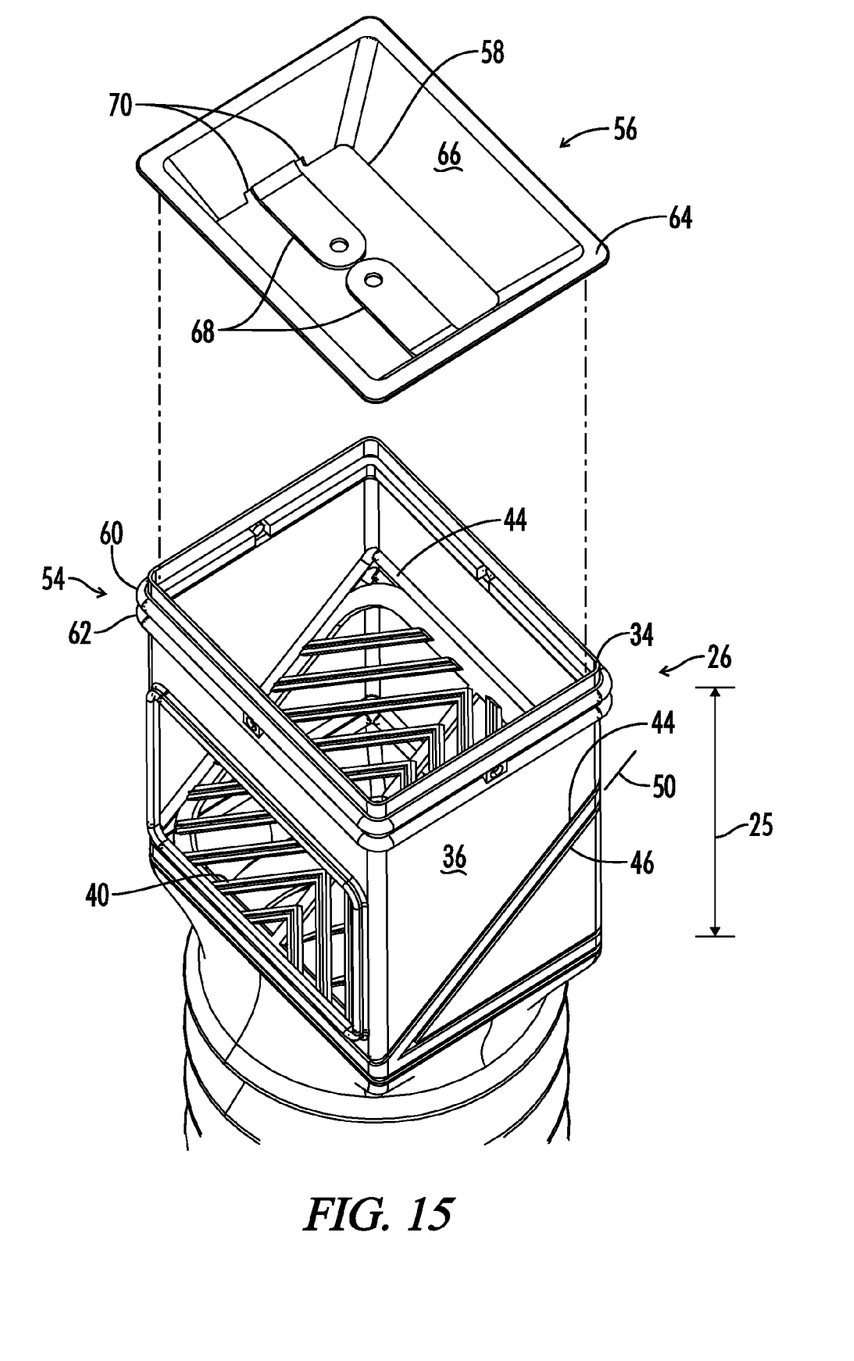
FIG. 15 is a partial top perspective view of a downspout drain filter made in accordance with the current disclosure.
Figure 16:
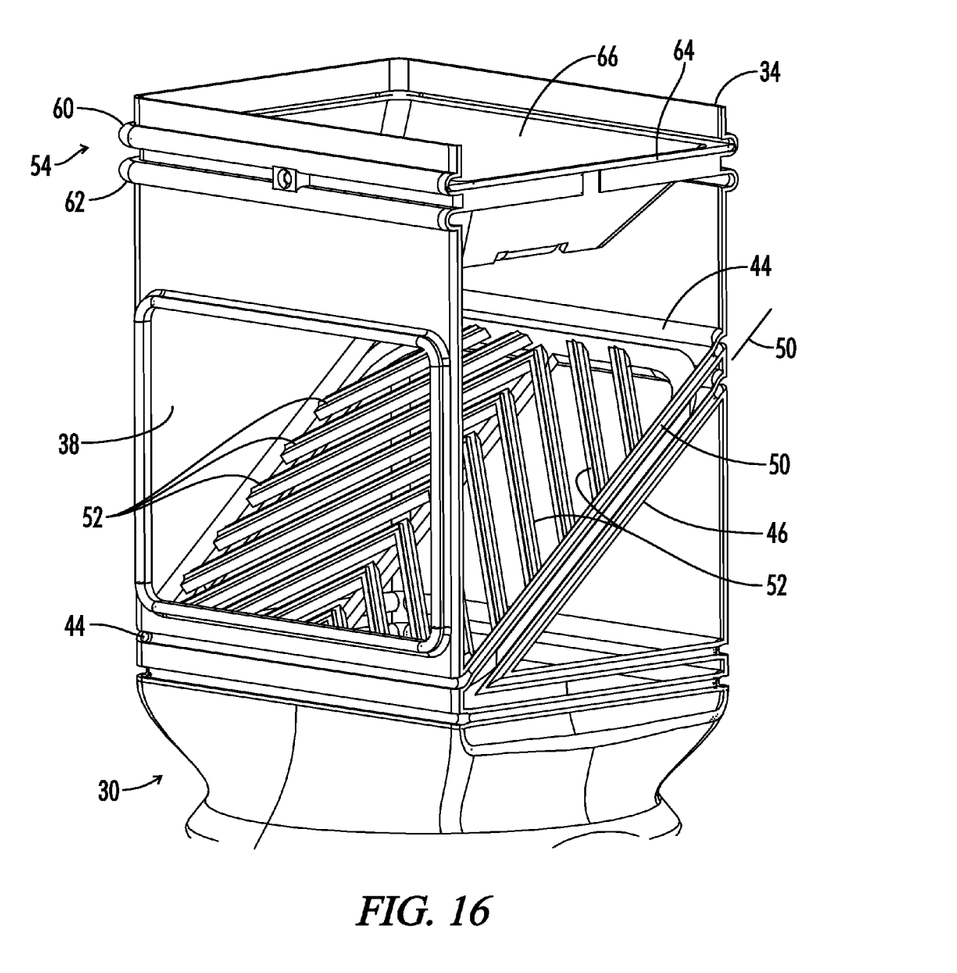
FIG. 16 shows a partial cutaway detailed view of the top portion of a downspout drain filter made in accordance with the current disclosure.

As best seen in FIGS. 2, 3, and 11, the drain filter 10 comprises an elongated housing 22 having an axis 24, a top portion 26, a bottom portion 28 and a transition portion 30 connecting the top portion 26 to the bottom portion 28.

The top portion 26, which can be described as an intake section 26, includes an intake opening 32 shaped to accept an end of the rain gutter downspout 12. An intake section wall 36 of the intake section 26 defines a top portion perimeter 34, which can be described as an intake section perimeter 34, while a debris opening 38 is positioned in the intake section wall 36 to allow debris 14 to exit the intake section 26. This debris 14 is directed toward the debris opening 38 by a filter 40 that is positioned in the intake section 26 to direct the debris 14 out the debris opening 38 while permitting fluid flow 16, such as rain, to pass.

The filter 40 is connected to the intake section 26 at the filter attachment location 42. The filter attachment location 42 preferably includes at least one filter channel 44 positioned to hold the filter 40 in the intake section 26. This filter channel 44 is positioned in the intake section wall 36 such that the filter 40 is skewed to the axis 24. In a more preferred embodiment a second filter channel 46 can be used to further confine the filter 40. For example, the filter channel 44 and filter channel 46 can be positioned to contain the perimeter 41 of the filter 40 between the two filter channels 44 and 46. These filter channels 44 and 46 are preferably spaced around the intake section perimeter 34 along the length 25 of the intake section 26. For example, the filter channels 44 and 46 can be spaced between the intake opening 32 and the transition section 30. The filter 40 is preferably removeable through the intake opening 32 so it can be repaired or replaced as needed.

Additionally, the filter 40 can include a pattern 48, that can be described as a grate pattern, which directs debris 14 out the debris opening 38 while allowing the rain to travel along the fluid flow path 16. This pattern 48 can be positioned in a filter plane 50 and can include a plurality of ribs 52 extending from the pattern 48 and plane 50. These ribs 52 facilitate removal of the debris by reducing flat contact surfaces on the filter 40, and more specifically on the pattern 48. This lack of flat surface on the filter 40 reduces the likelihood of the debris 14 sticking to the filter 40 and further facilitates the self-cleaning nature of the filter 40. This self-cleaning nature can be accredited to the fact that as additional rain travel the fluid flow path 16 in the downspout 12 that rain will apply force to the debris 14 that may be positioned on the filter and force that debris 14 out the debris opening 38. This movement is further facilitated by the positioning and the skewed angle of the filter 40 within the intake section 26.

The intake section 26 further includes a downspout attachment location 54 used to secure the drain filter 10 to the downspout 12. This downspout attachment location 54 can include a flexible collar 56 that defines a downspout attachment location perimeter 58 that is less than the intake section perimeter 34. A collar channel 60 can be positioned in the intake section 26 as part of the downspout attachment location 54. The collar channel can be positioned to removeably attach the collar 56 within the intake section 26.

In a preferred embodiment, there can be a second collar section channel 62 that can be positioned as part of a downspout attachment location 54. The collar channel 60 and 62 can effectively secure the collar 56 within the intake section 26. These channels 60 and 62 can effectively secure a collar flange 64 there between to secure the collar 56 in position.

A body 66, which can be described as an angled body 66, can extend from the collar flange 64 towards the axis 24. The body can extend in a direction that is skewed to the axis 24 and can be positioned to removeably secure the drain filter 10 to the downspout 12. This is preferably accomplished by having the collar flange 64 and body 66 substantially conform to the shape of the intake section wall 36. As the collar flange 64 and body 66 extend inward towards the axis 24 the area of the intake opening 32 is reduced. As such, the downspout 12 experiences a frictional fit with the collar 56 as it enters into the intake section 26 and engages the body 66.

This frictional fit can be further facilitated by a plurality of armatures 68 extending from the body 66 towards the axis 24. The armatures 68 can be positioned to secure the drain filter 10 to the downspout 12. This is best illustrated through FIG. 10 wherein the armatures 68 can be flexible in nature and extend out the intake opening 32 and impart frictional pressure inward against the downspout 12 and towards the axis 24. This flexible nature is further facilitated by armature slots 70 positioned proximate the attachment of the armature 60 to the body 66. Alternately described, the armature 68 have a nature static position in a plane that is proximately perpendicular to the axis 24. As such, when the armatures 68 are raised in a generally vertical direction and the drain filter 10 is positioned on the downspout 12, the armature 68 will press against the downspout 12 to try and return to their static position. This further facilitates the frictional fit of the drain filter 10 on the downspout 12.

The bottom portion 28, which can also be described as a discharge section 28, is connected to the transition portion 30 opposite the intake section 26. The discharge section 28 includes a flexible collapsible structure 72 extending from the transition portion 30. The structure 72 includes a plurality of foldable sections 74 with each foldable section 74 moveable between a first retracted position and a second extended position.

Figure 17A:
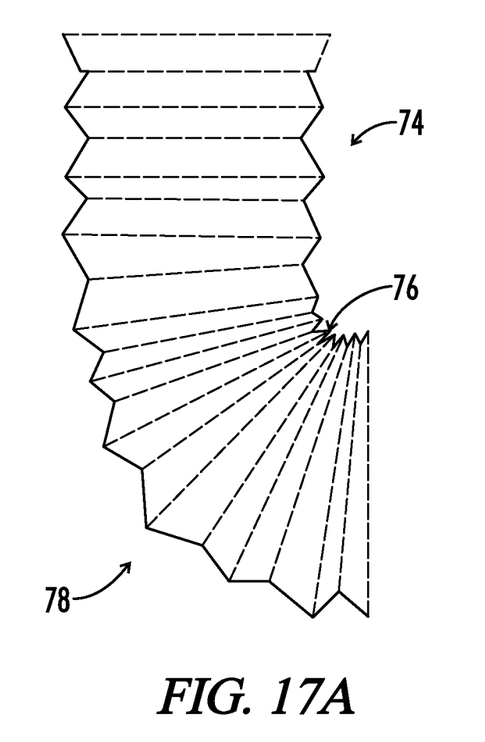
FIG. 17A shows an example of the flexible collapsible structure made in accordance with the current disclosure.

As seen in FIG. 17A, the foldable sections 74 can be selectively positionable between the retracted and extended positions. These foldable sections 74 can be substantially locked in either of those positions along a skewed cross section relative to the axis of the structure 72. For example, as seen in FIG. 17A, a first side 76 is effectively locked in a retracted position while a second side 78 is effectively locked in an extended position. Each foldable section 74 and the sides 76 and 78 can be adjusted through the use of forces applied to the structure 72 to convert the sections between the extended and retracted positions.

Figure 17B:
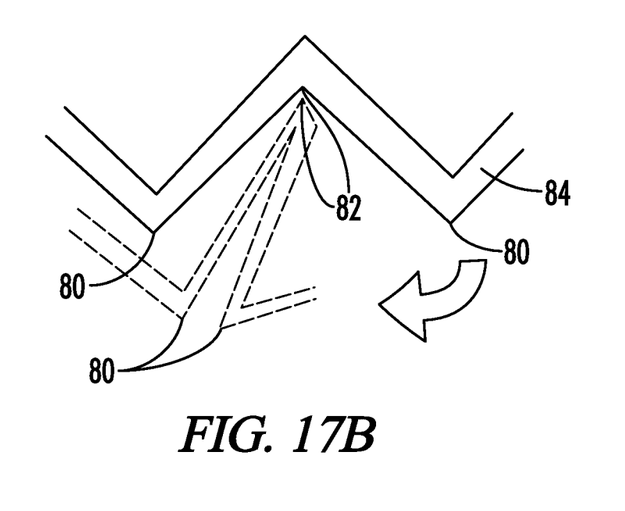
FIG. 17B shows an example of the collapsible nature of the structure.

The foldable sections 74 have a larger perimeter 80 and a smaller perimeter 82 that are defined by bends in the walls 84 of the structure 72. The extended and retractable positions can be generally achieved by manipulating the position of adjacent larger perimeters 80 and smaller perimeters 82. As seen in FIG. 17B, an extended position can be achieved when the cross sectional positioning of smaller perimeter 82 is between that of adjacent larger perimeters 80. Alternately, a collapsed position can be achieved when one of the larger perimeters 80 crosses over and passes the cross sectional location of the smaller perimeter 82. In FIG. 17B, the arrow, shown external to wall 84 of the structure 72, examples a direction of the movement of the larger perimeters 80 as described.

The discharge section 28 can further include a connection end 86 positioned opposite the transition portion 30. The connection end 86 can include a plurality of protrusions 88 that extend in a direction radially outward from the axis 24. Additionally, a connection end channel 90 can be positioned proximate the protrusions 88. The connection end channel 90 and protrusions 88 are positioned and shaped to engage a fluid flow element 20 to further facilitate the fluid flow 16 through the drain filter 10 from the downspout 12 and away from the structure 18.

The intake section 26 and the collar 56 can have various cross-sectional shapes including oval, circular, and polygonal. In a preferred embodiment, the intake section 26 and the collar 56 are quadrilaterally shaped, and more preferably rectangularly shaped. In this embodiment, the discharge section 28 is circular in shape while the transition section 30 converts the elongated housing 22 from the rectangular shape to the circular shape.

Figure 7:
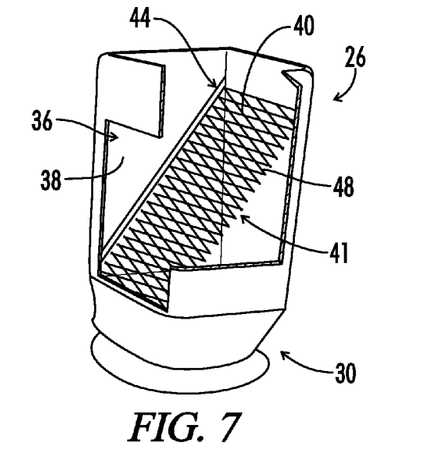
FIG. 7 shows a partial cutaway view of a top portion of a downspout drain filter made in accordance with the current disclosure.
Figure 8:
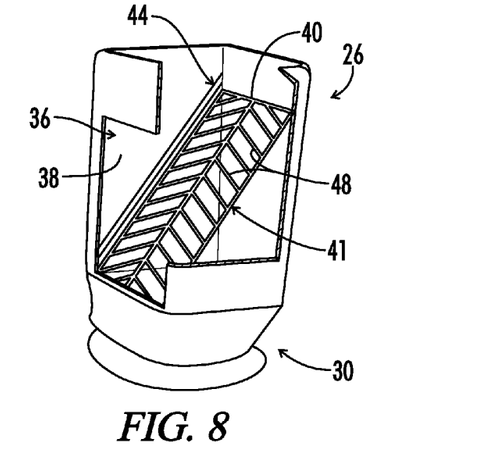
FIG. 8 shows a partial cutaway view similar to FIG. 7.
Figure 9:
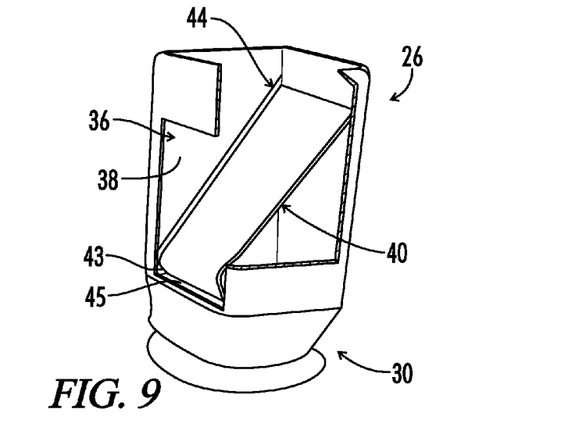
FIG. 9 shows a partial cutaway similar to FIGS. 7 and 8.
Figure 10:
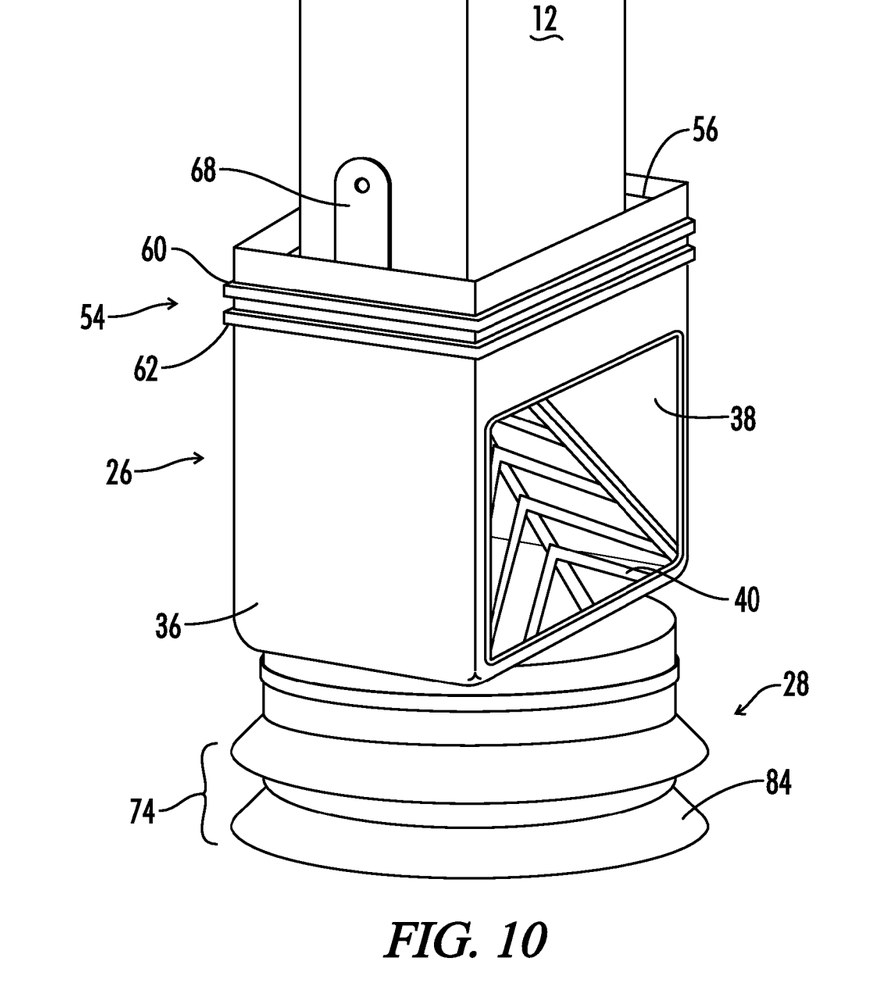
FIG. 10 is a perspective view of a downspout drain filter attached to a downspout in accordance with the current disclosure.

As seen in FIGS. 7-9, the filter 40 can take various shapes and still direct the debris 14 out the debris opening 38 while permitting fluid flow 16 through the elongated housing 22. This filter 40 can include a pattern 48 that has various openings along its length and width as shown in FIGS. 7 and 8. Alternately, the filter 40 can have a solid construction that uses a capillary effect to move the rain down around the edge 43 of the filter such that the water passes through opening 45 defined by the filter 40 and the elongated housing 22. In this embodiment the debris 14 is still directed out the debris opening 38.

Thus, although there have been described particular embodiments of the present invention of a new and useful Downspout Drain Connection And Filter it is not intended that such references be construed as limitations upon the scope of this invention except as set forth in the following claims.

What is claimed is:

1. A downspout drain filter for rain gutter downspouts, the downspout drain filter comprising:
    an elongated housing having an axis, a top portion, a bottom portion, and a transition portion connecting the top portion to the bottom portion;
    the top portion including:
        an intake opening;
        a top portion perimeter;
        a debris opening;
        a filter attachment location; and
        a downspout attachment location including a flexible collar defining a downspout attachment location perimeter less than the top portion perimeter, wherein the downspout attachment location of the top portion includes at least one collar channel positioned to removably attach the collar within the top portion perimeter, the flexible collar including:
            a collar flange shaped to removably engage the at least one collar channel to removably attach the collar within the top portion perimeter; and
            an angled body extending downwardly and inwardly from the collar flange toward the axis to removably secure the downspout drain filter to the rain gutter downspout, wherein the angled body is positioned within the top portion perimeter when the flange is engaged with the at least one collar channel;

the bottom portion including a flexible collapsible structure extending from the transition portion and a connection end positioned opposite the transition portion; and a filter positioned in the top portion to direct debris out the debris opening and permit liquid to pass to the bottom portion.

2. The downspout drain filter of claim 1, wherein the filter attachment location includes at least one filter channel positioned to hold the filter in the top portion skew to the axis.

3. The downspout drain filter of claim 2, wherein top portion includes a length and the at least one filter channel is spaced around the perimeter on the length.

4. The downspout drain filter of claim 3, wherein the top portion and the flexible collar are quadrilateral in shape.

5. The downspout drain filter of claim 1, wherein the connection end of the bottom portion includes a plurality of protrusions extending radially outward from the axis and a connection end channel.

6. The downspout drain filter of claim 1, wherein the flexible collapsible structure further including a plurality of foldable sections, each section movable between a first retracted position and a second extended position.

7. The downspout drain filter of claim 1, the flexible collar further including a plurality of resilient armatures, each armature extending from the angled body toward the axis when the downspout drain filter is not secured to the rain gutter downspout, each armature configured to be moved upwardly to removably secure the downspout drain filter to the rain gutter downspout by imparting inward pressure on the rain gutter downspout.

8. The downspout drain filter of claim 1, wherein the filter further includes a filter plane and a grated pattern positioned in the filter plane, the grated pattern having a plurality of elongated members, at least a majority of the elongated members each including a substantially flat upper surface portion and a rib extending outwardly away from the substantially flat upper surface portion.

9. A downspout drain filter for rain gutter downspouts, the downspout drain filter comprising:

an elongated housing having an axis and an intake section attached to a discharge section;

the intake section including:
 an intake opening positioned opposite the discharge section;
 an intake section wall defining an intake section perimeter;
 a debris opening positioned in the intake section wall;
 a filter attachment location; and
 a downspout attachment area;

the discharge section including a flexible collapsible tubular structure extending from the intake section and a connection end positioned opposite the intake section;

a removable collar including a collar flange and a body, the collar flange shaped to removably engage the downspout attachment area to removably attach the collar to the intake section wall, the body being angled and extending from the collar flange toward the axis and positioned to removably secure the downspout drain filter to the rain gutter downspout, wherein the angled body is positioned within the intake section perimeter when the collar flange is engaged with the downspout attachment area; and a removable filter positioned in the intake section to direct debris entering the intake opening out the debris opening and shaped to permit liquid to pass to the discharge section.

10. The downspout drain filter of claim 9, the removable collar further including a plurality of resilient armatures, each armature extending from the body toward the axis when the downspout drain filter is not secured to the rain gutter downspout, each armature configured to be moved upwardly to removably secure the downspout drain filter to the rain gutter downspout by imparting inward pressure on the rain gutter downspout.

11. The downspout drain filter of claim 9, wherein the filter attachment location includes a filter channel positioned in the intake section wall to hold the filter in the intake section skew to the axis and proximate to the debris opening.

12. The downspout drain filter of claim 9, wherein the connection end of the discharge section includes a connection end channel and a plurality of protrusions extending radially outward from the axis.

13. The downspout drain filter of claim 9, further including a transition section wherein:
 the intake section is rectangular in shape;
 the discharge section is circular in shape; and
 the transition section converts the elongated housing from the rectangular shape to the circular shape.

14. The downspout drain filter of claim 9, the flexible collapsible tubular structure further including a plurality of foldable sections, each section movable between a first retracted position and a second extended position.

15. The downspout drain filter of claim 9, the downspout attachment area including at least one collar channel positioned in the intake section wall and the collar flange is shaped to removably engage the at least one collar channel to removably attach the collar to the intake section wall.

16. A downspout drain filter for rain gutter downspouts, the downspout drain filter comprising:

an elongated housing having an axis and an intake section attached to a discharge section;

the intake section including:
 an intake opening positioned opposite the discharge section;
 an intake section wall defining an intake section perimeter;
 a debris opening positioned in the intake section wall;
 a filter attachment location; and
 a downspout attachment area including at least one collar channel positioned in the intake section wall;

the discharge section including a flexible collapsible tubular structure extending from the intake section and a connection end positioned opposite the intake section, the flexible collapsible tubular structure including a plurality of foldable sections, each section movable between a first retracted position and a second extended position;

a removable collar including a collar flange and a body, the collar flange shaped to removably engage the at least one collar channel to removably attach the collar to the intake section wall, the body being angled and extending downwardly and inwardly from the collar flange toward the axis and defining a downspout attachment location perimeter less than the intake section perimeter and positioned within the intake section perimeter to removably secure the downspout drain filter to the rain gutter downspout; and a removable filter positioned in the intake section to direct debris entering the intake opening out the debris opening and shaped to permit liquid to pass to the discharge section;

wherein the filter further includes a filter plane and a grated pattern positioned in the filter plane, the grated pattern having a plurality of elongated members, at least a majority of the elongated members each including a substantially flat upper surface portion and a rib extending outwardly away from the substantially flat upper surface portion.

17. A downspout drain filter for rain gutter downspouts, the downspout drain filter comprising:
- an elongated housing having an axis and an intake section attached to a discharge section;
- the intake section including:
  - an intake opening positioned opposite the discharge section;
  - an intake section wall defining an intake section perimeter;
  - a debris opening positioned in the intake section wall;
  - a filter attachment location; and
  - a downspout attachment area;
- the discharge section including a flexible collapsible tubular structure extending from the intake section and a connection end positioned opposite the intake section the flexible collapsible structure further including a plurality of foldable sections, each section movable between a first retracted position and a second extended position; and
- a removable filter positioned in the intake section to direct debris entering the intake opening out the debris opening and shaped to permit liquid to pass to the discharge section;
- wherein the filter has a pattern comprising a plurality of elongated members, at least a majority of the elongated members each including a substantially flat upper surface portion and a rib extending outwardly away from the substantially flat upper surface portion.

* * * * *